(12) United States Patent
VoBa et al.

(10) Patent No.: US 7,337,442 B2
(45) Date of Patent: Feb. 26, 2008

(54) METHODS AND SYSTEMS FOR COOPERATIVE SCHEDULING OF HARDWARE RESOURCE ELEMENTS

(75) Inventors: Son VoBa, Redmond, WA (US); Valerie R. See, Snohomish, WA (US); Tony Dwayne Pierce, Bellevue, WA (US); William J. Westerinen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 844 days.

(21) Appl. No.: 10/309,524

(22) Filed: Dec. 3, 2002

(65) Prior Publication Data

US 2004/0107421 A1 Jun. 3, 2004

(51) Int. Cl.
*G06F 9/46* (2006.01)
(52) U.S. Cl. ............................ 718/102; 718/100; 718/104
(58) Field of Classification Search ......... 718/100–108
See application file for complete search history.

(56) References Cited

U.S. PATENT DOCUMENTS

| | | | |
|---|---|---|---|
| 6,058,466 A * | 5/2000 | Panwar et al. ............ | 712/15 |
| 6,854,108 B1 * | 2/2005 | Choi ........................ | 717/125 |
| 2002/0184290 A1 * | 12/2002 | Olszewski et al. ......... | 709/102 |
| 2002/0194389 A1 * | 12/2002 | Worley et al. ............ | 709/310 |
| 2003/0105796 A1 * | 6/2003 | Sandri et al. ............. | 709/104 |
| 2003/0126366 A1 * | 7/2003 | Jourdan ................... | 711/122 |
| 2004/0010781 A1 * | 1/2004 | Maly et al. ............... | 717/143 |
| 2004/0054990 A1 * | 3/2004 | Liao et al. ................ | 717/124 |
| 2004/0107374 A1 * | 6/2004 | Cooper et al. ............ | 713/320 |
| 2004/0107421 A1 * | 6/2004 | VoBa et al. ............... | 718/102 |
| 2005/0071841 A1 * | 3/2005 | Hoflehner et al. ........ | 718/100 |

OTHER PUBLICATIONS

Marr, D.T. et al., "Hyper-Threading Technology Architecture and Microarchitecture", *Intel Technology Journal*, 2002, 1, INSPEC Abstract # C2002-10-5130-0002, http://developer.intel.com/technology/itj.

Stelzer, G., "Microprocessor Forum in San Jose. Interest in x86 Architecture", *Elektronik*, 2001, 50(26), 36-39 (No English Abstract available).

Wang, H. et al., "Speculative Precomputation: Exploring the Use of Multithreading for Latency", *Intel Technology Journal*, 2002, INSPEC Abstract # C2002-10-615N-017, http://developer.intel.com/technology/itj.

* cited by examiner

*Primary Examiner*—Meng-Al T. An
*Assistant Examiner*—Lilian Vo
(74) *Attorney, Agent, or Firm*—Woodcock Washburn LLP (57) ABSTRACT

Cooperatively scheduling hardware resources by providing information on shared resources within processor packages to the operating system. Logical processors may be included in packages in which some or all processor execution resources are shared among logical processors. In order to better schedule thread execution, information regarding which logical processors are sharing processor execution resources and information regarding which system resources are shared among processor packages is provided to the operating system. Extensions to the SRAT (static resource affinity table) can be used to provide this information.

17 Claims, 5 Drawing Sheets

METHODS AND SYSTEMS FOR COOPERATIVE SCHEDULING OF HARDWARE RESOURCE ELEMENTS

FIELD OF THE INVENTION

The present invention is directed to systems and methods for scheduling thread execution on a computer system. More particularly, the present invention relates to systems and methods for providing improved resource use by detecting processors in use in a computer system and more efficiently scheduling use of these processors.

BACKGROUND OF THE INVENTION

Conventionally, an operating system on a computer system manages the hardware and software resources of the computer system. The operating system controls access to each processor resident in the computer system and schedules their use by applications and other processes running on the computer system that require processor time. Generally, in order to be useful, it is required that this processor management function of the operating system divide the processor time available among the processes and applications running on the computer so that processor power is used effectively, and so the processes and applications receive enough processor time to function properly. However, conventionally, the operating system has limited information about processor topology and processor resources to schedule such tasks.

On many operating systems, multi-threading is used to increase overall system performance. Applications and other processes may utilize multiple streams of instructions (threads) in execution. In a multi-threading environment, multiple threads can operate in parallel on a single physical processor. The operating system schedules the execution of threads on the available processor(s).

Each processor includes a variety of resources. These resources include storage for information about a given thread being run, including information generated and used by the thread. This storage typically includes general purpose registers, control registers, APIC (advanced programmable interrupt controller) registers and some machine state registers. This information is called the architectural state of the processor.

Additionally, each processor includes processor execution resources used to execute the thread. These resources include caches, execution units, branch predictors, control logic, and buses. A complex instruction repository, such as Microcode may also be included in the processor execution resources.

When more than one thread is running simultaneously, the operating system allots a certain number of processor execution cycles to a first thread. When the cycles have been used, the architectural state of the processor on which the thread has been running is saved, and the architectural state for the next thread to be allotted cycles is loaded.

The standard processor architecture includes storage for only one architecture state along with only one set of processor execution resources on a single chip. Other processor architecture techniques have been developed in recent years to attempt to improve processor performance. One such architecture technique is chip multiprocessing (CMP). CMP places two or more logical processors on a single chip. The two or more logical processors each have storage for one architecture state. A separate set of processor execution resources is also included for each logical processor in CMP.

However, all the processors on one chip may share a large on-chip cache. This shared cache allows some efficiency when information stored in the cache while a thread is executing on one processor is required by the other processor. Cache misses may be reduced, and in this way, efficiency increased.

Another processor architecture utilizes symmetric multithreading technology (SMT) architecture. A SMT technology architecture makes a single physical processor chip appear to the operating system as multiple logical processors. To do this, there is one copy of the architecture state on the chip for each logical processor. However, all the logical processors on the chip share a single set of physical processor execution resources. Operating systems and user programs can schedule threads to logical processors as they would on conventional physical processors in a multiprocessor system. Thus, a first logical processor may be running a first thread while a second logical processor may be running a second thread. Because these two threads share one set of processor execution resources, the second thread can use resources that would be otherwise idle if only one thread was executing. The result is an increased utilization of the execution resources within each physical processor package. For example, if a floating-point operation uses different parts of the physical processor execution resources than an addition and load operation, then one logical processor can perform a floating-point operation while the other performs an addition and load operation. Because the threads running on the logical processors may occasionally need the same part of the physical processor execution resources, this may occasionally require one thread to wait for the resource to be free. However, while sometimes less efficient than two separate physical processors, this solution may be more efficient than the traditional architecture in which one logical processor was implemented in one physical processor.

Other architectures are conceivable containing multiple logical processors, each with its own architecture state, but with some sharing of physical processor execution resources and some duplication of physical processor execution resources for each logical processor.

Each logical processor may be scheduled just as traditional processors are scheduled. However, conventionally, there is no way for a thread manager (the processor scheduling function within an operating system) to distinguish between (1) a logical processor sharing all processor execution resources with one or more other logical processors, (2) a logical processor sharing a cache with another processor on one chip, and (3) a conventional logical processor, with its own processor execution resources, unshared with any other processor. Generally, there is no way for the thread manager to determine which, if any, processor execution resources two logical processors share. This may result in less-than-optimal scheduling.

For example, where four logical processors, A, B, C, and D, are available, where A and B are hyper-threaded and share processor execution resources, and where C and D share a cache, no architectural details for the processors will be apparent to the thread manager. Where two threads are being scheduled, scheduling the two threads for A and B may be less optimal than scheduling one for A and one for C, since A and B share processor execution resources and there may be some contention. And where, among other threads, two threads are running which may benefit from sharing a cache, the thread manager will not be aware that C and D share a cache, and may not schedule the two threads to C and D.

Conventionally, the only way for thread manager to know that logical processors are hyper-threaded and share processor execution resources is by performing the CPUID instruction which causes the processor to provide identification information, such as model, version, speed, vendor/manufacturer string. This identification information can be compared to stored information within the operating system to determine that a certain chip contains two logical processors but that they share all processor execution resources. The thread manager may then attempt to optimize for the symmetric multi-threading.

However, while a thread manager may be able to identify processor types for which information is currently available, when new processor types become available the operating system needs to be revised. If it is not revised, it does not have information about the processors in the computer system and can not schedule them efficiently. Unrevised operating systems are not forward-compatible, but are forced to use old processor descriptions to handle new processor types, even though they may not be correct descriptions. Additionally, while an operating system may be able to identify and deal with SMT situations where all processor execution resources are shared, future processors may implement other methods for sharing processing resources. Flexibility in identifying to the operating system new processor resource sharing schemas is necessary which is not found in current mechanisms for identifying processors.

Additionally, current thread manager systems can not adequately handle mixed-instruction set environments. Processors may use various instruction sets, such as the x86 instruction set or the IA64 instruction set. Graphics processors may use their own unique instruction set. While multi-processor systems today generally use processors with one instruction set, future configurations may more frequently include processors with different instruction sets. However, thread manager systems are not currently able to easily accommodate mixed instruction set environments and schedule threads requiring processors operating with a specific instruction set.

Thus, there is a need for a flexible method for presenting processor resource information to the thread manager for use in optimizing the scheduling of tasks onto logical processors.

SUMMARY OF THE INVENTION

In view of the foregoing, methods and systems are provided for an extensible mechanism that permits abstraction of computing elements present in a system at a level lower than simply identifying logical processors. This abstraction reflects that some logical processors may have interdependencies due to shared resources, and what resources are shared. Such grouping information about computing elements present in a computer system is presented to the thread manager for use in optimizing processor use.

In one embodiment, the thread manager portion of the operating system is presented with package information. The package information details which logical processors are grouped together into one physical package. Logical processors which are included in a single package are assumed to share some processor execution resources. Package information includes detailed information about which processor execution resources are shared by the logical processors in a package.

In another embodiment, logical processors are grouped together into domains. Domain information is provided to the thread manager. Logical processors grouped in one domain may share memory or other system resources. Domain information can include information about what system resources, such as memory, are shared in one domain. While other logical processors may have access to these system resources, the logical processors in the domain are given preferential access to the system resources in the domain.

In one embodiment, extensions to a SRAT (static resource affinity table) structure are presented, which are used to describe which logical processors are contained in the same package and specifically which resources are shared within the package. Similarly, extensions to the SRAT are presented which describe packages and memory included in specified domains.

Other features and embodiments of the present invention are described below.

BRIEF DESCRIPTION OF THE DRAWINGS

The system and methods for scheduling in accordance with the present invention are further described with reference to the accompanying drawings in which.

DETAILED DESCRIPTION OF ILLUSTRATIVE EMBODIMENTS

Overview

An operating system that supports multi-threading, which is used on a computer system including multiple logical processors and multiple memory resources, is faced with the challenge of attempting to schedule thread execution so that the resources are used efficiently. In order to allow such an operating system to more efficiently schedule processor and memory resources, information regarding shared processor and system resources and processor topology is presented to and used by the operating system.

Exemplary Computing Device

Figure 1:
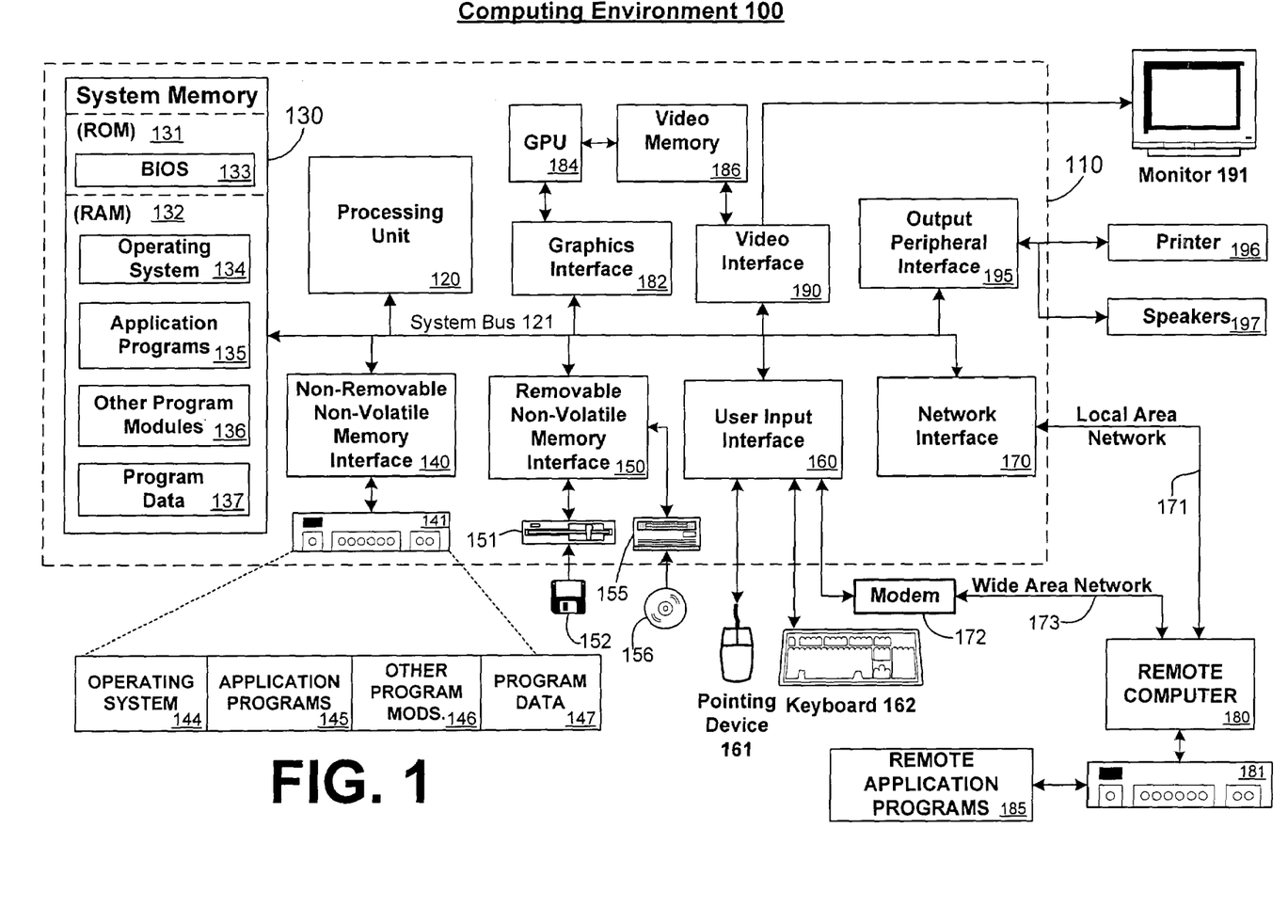
FIG. 1 is a block diagram representing an exemplary non-limiting computing system in which the present invention may be implemented.

FIG. 1 and the following discussion are intended to provide a brief general description of a suitable computing environment in which the invention may be implemented. It should be understood, however, that handheld, portable and other computing devices and computing objects of all kinds are contemplated for use in connection with the present invention, as described above. Thus, while a general purpose computer is described below, this is but one example, and the present invention may be implemented with other computing devices, such as a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance, or other computing devices and objects as well. In essence, anywhere that data may be stored or from which data may be retrieved is a desirable, or suitable, environment for operation according to the invention.

Although not required, the invention can be implemented via an operating system, for use by a developer of services for a device or object, and/or included within application software that operates according to the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer system 110. Components of computer system 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer system 110 typically includes a variety of computer readable media. Computer readable media can be any available media that can be accessed by computer system 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), digital versatile disks (DVD) or other optical disk storage, magnetic cassettes, magnetic tape, magnetic disk storage or other magnetic storage devices, or any other medium which can be used to store the desired information and which can accessed by computer system 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer system 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer system 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid star ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer system 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer system 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer system 110. A monitor 191 or other type of display device is also connected to the system bus 121 via an interface, such as a video interface 190, which may in turn communicate with video memory 186. In addition to monitor 191, computer systems may also include other peripheral output devices such as speakers 197 and printer 196, which may be connected through an output peripheral interface 195.

The computer system 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer system 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer system 110 is connected to the LAN 171 through a network interface or adapter 170. When used in a WAN networking environment, the computer system 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer system 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s NET platform includes servers, building-block services, such as Web-based data storage and downloadable device software. While exemplary embodiments herein are described in connection with software residing on a computing device, one or more portions of the invention may also be implemented via an operating system, application programming interface (API) or a "middle man" object between any of a coprocessor, a display device and requesting object, such that operation according to the invention may be performed by, supported in or accessed via all of NET's languages and services, and in other distributed computing frameworks as well.

Cooperative Scheduling of Hardware Resources

Figure 2:
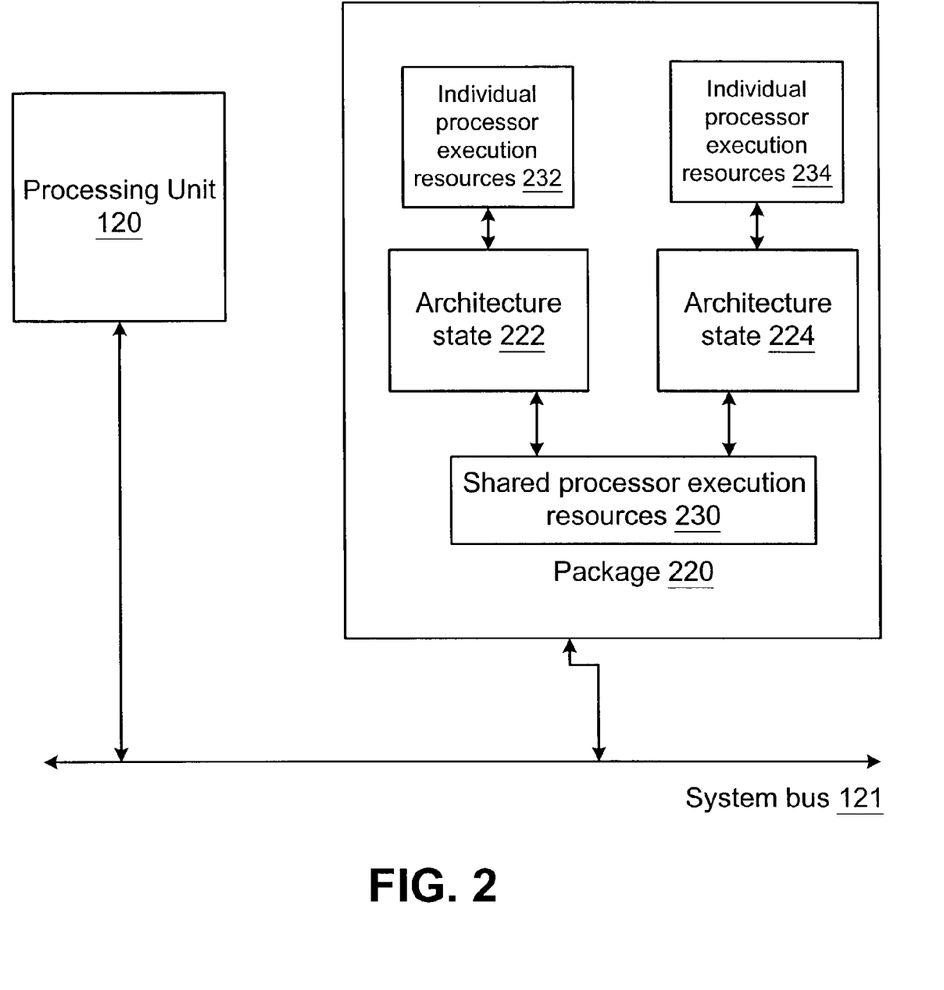
FIG. 2 is a block diagram representing part of an exemplary non-limiting multi-processor computing system in which the present invention may be implemented.

Processors other than processing unit 120 may be included in a computer system 110. As an example, as shown in FIG. 2, processing unit 120 and processing unit 220 may be two processor packages coupled to system bus 121. Package 220 includes two architecture states 222 and 224. These two architecture states 222 and 224 each contain the storage and related resources for one thread. The two architecture states 222 and 224 share the shared processor execution resources 230. Architecture state 222 also has certain individual processor execution resources 232, and architecture state 224 has individual processor execution resources 234. Each architecture state can be seen as a logical processor which can execute a thread.

According to an embodiment of the invention, the operating system is provided with information regarding the processors present in the computer system and whether they share processor resources. So in the exemplary topology of FIG. 2, the operating system will be provided with the information that logical processors 222 and 224 share the shared processor execution resources 230. Alternatively, information about the shared processor execution resources 230 is not provided to the operating system, but the operating system knows that the two processors are part of a single package and share some resources (but not necessarily which resources are shared).

Figure 3:
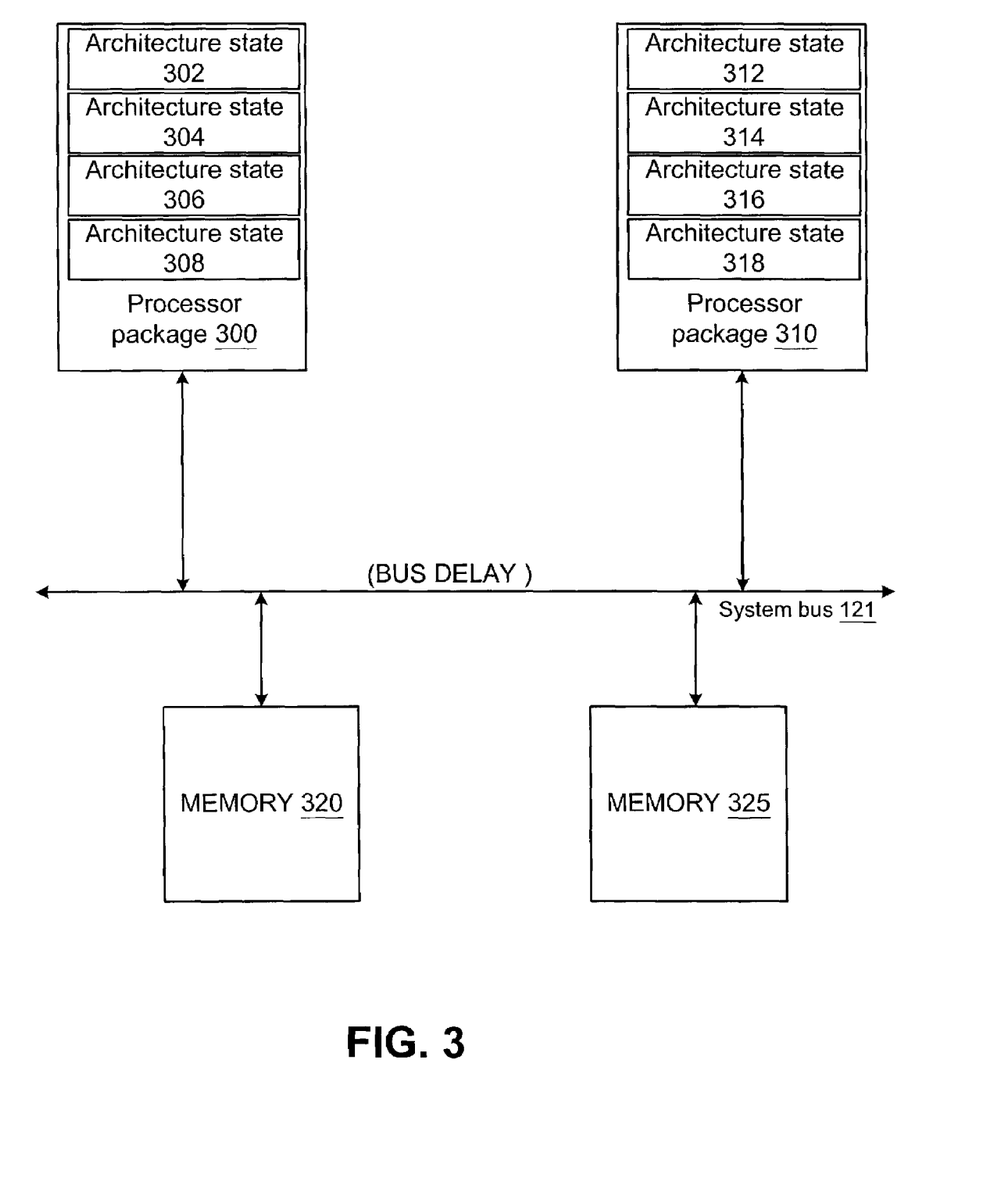
FIG. 3 is a block diagram representing part of an exemplary non-limiting multi-processor computing system in which the present invention may be implemented.

The operating system is also provided with information regarding the sharing of system resources. For example, as shown in FIG. 3, another exemplary system topology includes two processor packages 300 and 310 with four architecture states each (302, 304, 306, 308, 312, 314, 316, and 318) and two memories 320 and 325. Because of a delay in the system bus 121, it is preferable when the architecture states (302, 304, 306, and 308) in package 300 use memory 320 and the architecture states (312, 314, 316 and 318) in package 310 use the memory 325. This information regarding the preferential use of the memories is provided to the operating system.

Figure 4:
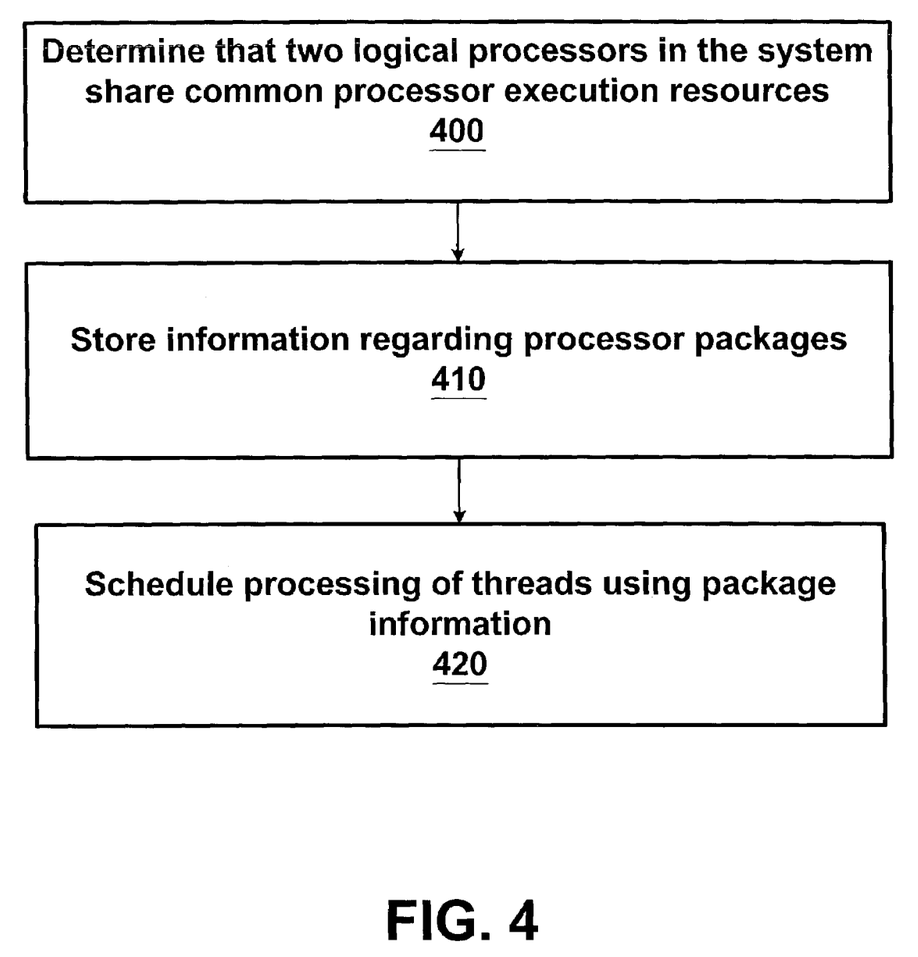
FIG. 4 is a block diagram representing a method of implementing efficient processor scheduling where two logical processors share common execution resources according to one embodiment of the invention.

As shown in FIG. 4, in order to implement efficient processor utilization, in step 400, the determination is made that at least two logical processors in the system share common processor execution resources. This package information about the logical processors is stored in step 410. The operating system then can access this information in order to schedule thread execution. In step 420, this package information is used to schedule processing of threads on the processors available in the computer system.

Figure 5:
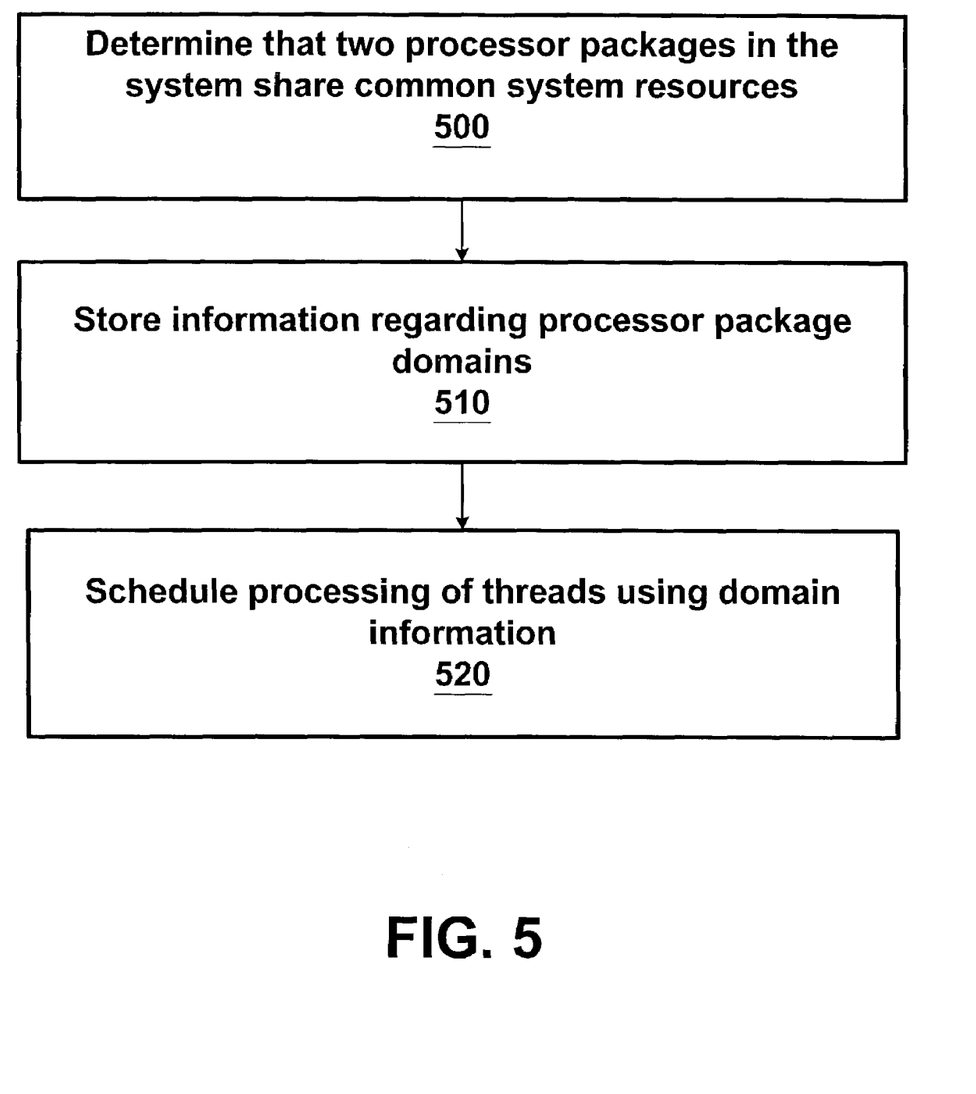
FIG. 5 is a block diagram representing a method of implementing efficient processor scheduling where two processor packages share common system resources according to one embodiment of the invention.

As shown in FIG. 5, in order to implement efficient processor scheduling where a system resource is shared among more than one processor, in step 500, the detrmination is made that at least two processor packages in the system share common system resources and should be considered part of one domain with the system resources. This information, domain information, is stored in step 510. The operating system then can access this information in order to schedule thread execution. In step 520, this domain information is used to schedule the processing of threads on the processors available in the computer system.

SRAT Implementation

According to one embodiment of the invention, the information is presented to the operating system through extensions to the Static Resource Affinity Table (SRAT). The SRAT contains topology information for all the processors and memory present in a system at system boot and for memory that can be hot-added (that is memory that can be added to the system while it is running, without requiring a reboot). The topology information identifies the sets of processors and physical memory ranges in the system, enabling a tight coupling between the processors and memory ranges. The information is available to the operating system at boot time. The SRAT conventionally includes structures which contain describe elements of the system, and topology information may be derived from the examination of these structures. New structures are added to the SRAT to implement the invention.

For each logical processor in the system, information describing the processor is stored in an architecture state affinity structure. In this structure, the logical processor is identified so that the operating system can schedule threads for execution on the logical processor. The logical processor is identified by APIC (Advanced Programmable Interrupt Controller) ID. Each logical processor has a unique APIC ID. Additionally, the architecture state affinity structure contains an indication of the instruction set type for the logical processor. Finally, a package identifier is stored, indicating a package which the logical processor is a part of. With reference to FIG. 2, processing unit 120 is in one package, and architecture states 222 and 224 are in another. Therefore the architecture state affinity structure for processing unit 120 will contain one package identifier, and the architecture state affinity structures for logical processors 222 and 224 will share the same package identifier as each other (but a different one than that in the structure for processing unit 120). With reference to FIG. 3, the affinity structures for architecture states 302, 304, 306 and 308 will contain one package identifier, and the structures for architecture states 312, 314, 316 and 318 will contain another.

One exemplary architecture state affinity structure follows the format shown in Table 1:

TABLE 1

Architecture State Affinity Structure

| Field | Byte length | Byte offset | Description |
| --- | --- | --- | --- |
| Type | 1 | 0 | Integer value indicating that structure is Architecture State Affinity Structure, in one embodiment, 2 |
| Length | 1 | 1 | 16 bytes |
| Package | 1 | 2 | Package identifier - integer that represents the physical processor "package" this architecture state resides within |
| APIC ID | 1 | 3 | The APIC ID associated with this architecture state |
| Flags | 4 | 4 | Architecture state affinity structure flags. |
| Instruction Set Type | 1 | 8 | Integer representing the instruction set type.<br>0 = x86<br>1 = IA64<br>2 = x86-64<br>3 = PPC<br>4 = Alpha<br>5 = MIPS<br>6 = GPU Instruction Set 1<br>7 = GPU Instruction Set 2<br>8-255 = reserved |
| Reserved | 7 | 9 | Reserved |

In a architecture state affinity structure, the type field stores a byte indicating that the structure is an architecture state affinity structure, and the length field stores the length of the structure. The package field stores the package number, the APIC ID field the APIC ID for the logical processor. The instruction set type field stores an integer representing the instruction set type, and the last 7 bytes are reserved for later use. The flags field is set according to Table 2:

TABLE 2

Architecture State Affinity Structure Flags

| Flags | Bit length | Bit offset | Description |
| --- | --- | --- | --- |
| Enabled | 1 | 0 | If clear, the operating system ignores the contents of Architecture State Affinity structure. This allows the BIOS to populate the SRAT with a static number of structures but only enable them as necessary. |
| Reserved | 31 | 1 | Set to zero when not used. |

The first bit of the flags field indicates whether this structure should be ignored by the operating system, and the other flags are reserved.

In addition to an architecture state affinity structure for each logical processor, according to one embodiment the extensions to the SRAT includes a package affinity structure for each package. With reference to FIG. 2, there will be one package affinity structure for processing unit 120, and one for package 220. With reference to FIG. 3, there will be one package affinity structure for processor package 300, and one for processor package 310. A package affinity structure contains information describing which resources are shared by the logical processors in the package. One exemplary package affinity structure follows the format shown in Table 3:

TABLE 3

Package Affinity Structure

| Field | Byte length | Byte offset | Description |
|---|---|---|---|
| Type | 1 | 0 | Integer value indicating that structure is Package Affinity Structure, in one embodiment, 3. |
| Length | 1 | 1 | 16 |
| Package | 1 | 2 | Package identifier |
| Domain | 1 | 3 | Domain identifier - identifies the domain this package resides within |
| Flags (shared resources) | 4 | 4 | Package affinity structure shared resources flags. |
| Flags (general) | 4 | 8 | Package affinity structure general flags. |
| Reserved | 4 | 12 | Reserved |

In a package affinity structure, the type field stores a byte indicating that the structure is a package affinity structure, and the length field stores the length of the structure. The package field stores the package number for the package being described. The domain identifier will be addressed later. The last four bytes are reserved. The shared resources flags are set according to Table 4 and the general flags according to Table 5:

TABLE 4

Package Affinity Structure Shared Resource Flags

| Flags | Bit length | Bit offset | Description |
|---|---|---|---|
| Shared Resources | 1 | 0 | If clear, there are no shared resources between the architecture states in this package. |
| I caches | 1 | 1 | Set = shared resource |
| D caches | 1 | 2 | Set = shared resource |
| Execution support | 1 | 3 | Set = shared resource. This flag covers items like execution units, branch predictors, common microcode repositories, etc. |
| On chip main memory | 1 | 4 | Set = shared resource. This is a flag for "system on chip" package designs not currently in existence, but which might implement main memory (or a portion thereof) in a shared package one or more logical processors. |
| External memory | 1 | 5 | Set = shared resource. This is a flag for package designs not currently in existence, but where a resident memory controller and sections of system memory are actually attached to "architecture states" |
| Power planes | 1 | 6 | Set = shared resource. |
| Reserved | 23 | 7 | Set to zero when not used. |

TABLE 5

Package Affinity Structure General Flags

| Flags | Bit length | Bit offset | Description |
|---|---|---|---|
| Enabled | 1 | 0 | If clear, the operating system ignores the contents of Package Affinity structure. This allows the BIOS to populate the SRAT with a static number of structures but only enable them as necessary. |
| Reserved | 31 | 1 | Set to zero when not used. |

The first bit of the shared resources flags field is set if there is any resource sharing between logical processors in the package. The next set of flags identifies the shared resources shared. If the bit associated with the flag is set, then that resource is shared. The resource that may be shared in one embodiment comprise: I caches (instruction caches), D caches (data caches), execution support, on chip main memory, external memory, and power plane.

The first bit of the general flags field indicates whether the package structure should be ignored by the operating system, and the other flags are reserved.

So, with reference to FIG. 2, processing unit 120 would be described in an architecture state affinity structure. The APIC ID of processing unit 120 would be included in that structure. A package number would also be included in the package field of the architecture state affinity structure. Logical processor 222 would also have an architecture state affinity structure, as would logical processor 224. A second package number would be included in the architecture state affinity structures for logical processors 222 and 224. The package number would be the same for the architecture state affinity structures for logical processors 222 and 224 since they are both included in one package 220. Additionally, a package affinity structure would be included for both processing unit 120 and for package 220. The package affinity structure for package 220 would include shared resource flags indicating what resources are included in the shared processor execution resources 230.

The SRAT also contains a structure which describes regions of memory. For the region of memory described, the memory affinity structure contains the base address of the region, the length of the region, and the type of the region. The memory affinity structure also can store information regarding whether the region of memory is "hot-plug-gable"—that is, whether it can be connected to and detected by the system bus during operation (rather than only before startup.) As seen in Table 3, the package affinity structure includes a domain identifier. Memory affinity structures may also be assigned a domain. This groups packages with memories to indicate to the operating system that architecture states in packages in the domain should be given preferential use of the memories in the domain. For example, in FIG. 3, processor package 300 and memory 320 are assigned one domain, which processor package 310 and memory 324 are assigned another domain. Similarly, domains may also describe proximity to input/output (I/O) devices.

While the SRAT and package and package domain groups have been described in detail, it is contemplated that other methods of providing this grouping information to the operating system may be used. For example, data separate from the SRAT construct may be provided to the operating system. Additionally, while the SRAT structure containing package affinity structures and architecture state affinity structures has been described, other data structures and are contemplated. For example, an object oriented schema would provide flexibility and extensibility for the data being provided to the operating system, and such a schema is contemplated for use in accordance with the invention.

While the invention has been described with reference to general computer processors as logical processors, the use of the inventive systems and methods with other logical processors, such as graphical processing units, is also contemplated for use in accordance with the invention.

CONCLUSION

As mentioned above, while exemplary embodiments of the present invention have been described in connection with various computing devices and network architectures, the underlying concepts may be applied to any computing device or system in which it is desirable to implement cooperative scheduling of hardware resource elements. Thus, the methods and systems of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by the invention.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the signal processing services of the present invention, e.g., through the use of a data processing API or the like, are preferably implemented in a high level procedural or object oriented programming language to communicate with a computer. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, or a receiving machine having the signal processing capabilities as described in exemplary embodiments above becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather should be construed in breadth and scope in accordance with the appended claims.

What is claimed:

1. A method for scheduling processor use on a computer system comprising at least one processor package having two or more logical processors sharing common processor execution resources, the method comprising:

storing package information comprising an indication that said first and second logical processors share said processor package and said common processor execution resources, said common processor execution resources indicating said first and second logical processors share a common physical processor, wherein said package information is stored in a package affinity structure in a static resource allocation table, and wherein said static resource allocation table comprises a first architecture state affinity structure for said first logical processor comprising a first package identifier, a second architecture state affinity structure for said second logical processor comprising said first package identifier, and said package affinity structure comprises said first package identifier; and sharing said package information with an operating system on said computer system, wherein said operating system utilizes said package information in scheduling processor use, and wherein utilizing said package information in scheduling processor use comprises giving preference to not scheduling two threads that require said common processor execution resources to run simultaneously on said first and second logical processors.

2. The method of claim 1, where said package information further comprises information regarding one or more types of said common processor execution resources.

3. The method of claim 2, where said one or more types of said common processor execution resources are selected from among: I caches, D caches, execution support, on chip main memory, external memory, and power planes.

4. The method of claim 1 where said package affinity structure comprises information regarding one or more types of said common processor execution resources.

5. The method of claim 1, where storing package information further comprises storing information in an object-oriented schema.

6. One or more computer-readable storage media having computer-executable instructions to perform a method for scheduling processor use on a computer system comprising two or more processor packages where that at least a first processor package and a second processor package from among said two or more processors packages share common system characteristics, the at least first and second processor package comprising a first logical processor, and a second logical processor that share said common system characteristics, said common system characteristics indicating said first and second logical processors share a common physical processor, comprising:

storing domain information comprising an indication that said first and second processor packages share said common system characteristics, said common system characteristics indicating said first and second processor packages share a common physical processor, wherein said domain information is stored in a package affinity structure in a static resource allocation table, and wherein said static resource allocation table comprises a first architecture state affinity structure for said first logical processor comprising a first package identifier, a second architecture state affinity structure for said second logical processor comprising said first package identifier, and said package affinity structure comprises said first package identifier; and sharing said domain information with an operating system on said computer system, wherein said operating system utilizes said domain information in scheduling processor use, and wherein utilizing said domain information in scheduling processor use comprises giving preference to not scheduling two threads that require said common system characteristics to run simultaneously on said first and second logical processors.

7. The computer-readable storage media of claim 6, where said domain information further comprises information regarding one or more types of said common system characteristics.

8. The computer-readable storage media of claim 7, where said one or more types of said common system characteristics are selected from among the following: proximity to a specified memory and proximity to I/O devices.

9. The computer-readable storage media of claim 6, where storing domain information further comprises storing information in an object-oriented schema.

10. A computer device comprising:
at least one physical processor;
at least one processor package having a first logical processor and a second logical processor, wherein said second logical processor shares common processor execution resources with said first logical processor, said common processor execution resources indicate said first and second logical processors share a common physical processor;
storage for storing package information comprising an indication that said first and second logical processors share said common processor execution resources, wherein said package information is stored in a package affinity structure in a static resource allocation table, and wherein said static resource allocation table comprises a first architecture state affinity structure for said first logical processor comprising a first package identifier, a second architecture state affinity structure for said second logical processor comprising said first package identifier, and said package affinity structure comprises said first package identifier; and
an operating system for scheduling processing on said processor package and said first and said second logical processors, wherein said operating system schedules processing to said processor package and said first and second logical processors based on said stored package information, and wherein scheduling processing based on said stored package information comprises giving preference to not scheduling two threads that require said common processor execution resources to run simultaneously on said first and second logical processors.

11. The computer device of claim 10, where said information further comprises information regarding one or more types of said common processor execution resources.

12. The computer device of claim 11, where said one or more types of said common processor execution resources are selected from among: I caches, D caches, execution support, on chip main memory, external memory, and power planes.

13. The computer device of claim 10, where said package affinity structure comprises information regarding one or more types of said common processor execution resources.

14. A computer device for efficient computer processing, comprising:
at least one physical processor;
at least one processor package having a first logical processor and a second logical processor, wherein said second logical processor shares common system characteristics with said first logical processor, said common system characteristics indicate said first and second logical processors share a common physical processor;
storage for storing domain information comprising an indication that said first and second logical processors share said common system characteristics, wherein said domain information is stored in a package affinity structure in a static resource allocation table, and wherein said static resource allocation table comprises a first architecture state affinity structure for said first logical processor comprising a first package identifier, a second architecture state affinity structure for said second logical processor comprising said first package identifier, and said package affinity structure comprises said first package identifier; and
an operating system for scheduling processing on said processor package and said first and said second logical processors, wherein said operating system schedules processing to said processor package and said first and second logical processors based on said stored domain information, and wherein utilizing said domain information in scheduling processor use comprises giving preference to not scheduling two threads that require said common system characteristics to run simultaneously on said first and second logical processors.

15. The computer device of claim 14, where said domain information further comprises information regarding one or more types of said common system characteristics.

16. The computer device of claim 15, where said one or more types of said common system characteristics comprises: proximity to a specified memory.

17. A processor use scheduler for scheduling processor use on a computer system comprising two or more logical processors sharing common processor execution resources, the scheduler comprising:
means for storing package information in a package affinity structure in a static resource allocation table, wherein said static resource allocation table comprises a different architecture state affinity structure for each of said logical processors comprising a package identifier, and said package affinity structure comprises said package identifier, and wherein said package information comprises an indication that said logical processors share a processor package and said common processor execution resources, said common processor execution resources indicating said first and second logical processors share a common physical processor; and
means for sharing said package information with an operating system on said computer system, wherein said operating system utilizes said package information in scheduling processor use, and wherein utilizing said package information in scheduling processor use comprises giving preference to not scheduling two threads that require said common processor execution resources to run simultaneously on said logical processors.

* * * * *